US012658334B2

(12) United States Patent
Garcia-Diaz et al.

(10) Patent No.: US 12,658,334 B2
(45) Date of Patent: Jun. 16, 2026

(54) COMBINED CORROSION MITIGATION AND HYDROGEN ISOTOPE EXTRACTION FROM MOLTEN SALTS

(71) Applicant: BATTELLE SAVANNAH RIVER ALLIANCE, LLC, Aiken, SC (US)

(72) Inventors: Brenda L. Garcia-Diaz, Aiken, SC (US); Christopher S. Dandeneau, Augusta, GA (US); Dale A. Hitchcock, Aiken, SC (US); Dave Babineau, Aiken, SC (US); Robert Sindelar, Martinez, GA (US); Hector Colon-Mercado, Aiken, SC (US); George K. Larsen, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 773 days.

(21) Appl. No.: 17/969,060

(22) Filed: Oct. 19, 2022

(65) Prior Publication Data

US 2024/0136081 A1 Apr. 25, 2024
US 2024/0233972 A9 Jul. 11, 2024

(51) Int. Cl.

| | |
|---|---|
| ***G21G 1/00*** | (2006.01) |
| ***C22B 26/12*** | (2006.01) |
| ***C22B 26/20*** | (2006.01) |
| ***C25B 1/02*** | (2006.01) |
| ***C25B 5/00*** | (2006.01) |

(Continued)

(52) U.S. Cl.

CPC ............... *G21G 1/001* (2013.01); *C25B 1/02* (2013.01); *C25B 9/09* (2021.01); *G21G 1/02* (2013.01); *C22B 26/12* (2013.01); *C22B 26/20* (2013.01); *C25B 5/00* (2013.01); *G21G 2001/0094* (2013.01)

(58) Field of Classification Search

CPC .................................... C25B 1/02; C25B 5/00

See application file for complete search history.

(56) References Cited

U.S. PATENT DOCUMENTS

| | | | | |
|---|---|---|---|---|
| 3,407,094 | A | 10/1968 | Juda | |
| 3,957,597 | A | 5/1976 | Maroni | |
| 3,963,564 | A | 6/1976 | Lecocq | |
| 4,227,988 | A * | 10/1980 | Galwey | G01N 27/49 204/229.1 |

(Continued)

FOREIGN PATENT DOCUMENTS

| | | | |
|---|---|---|---|
| CN | 109036610 | A | 12/2018 |
| WO | WO 2013/166505 | A2 | 11/2013 |

OTHER PUBLICATIONS

Carotti et al., "An electrochemical study of hydrogen in molten 2LiF—BeF2 (FliBe) with addition of LiH", Electrochimica Acta, vol. 367, 2021, 13 pages.

(Continued)

*Primary Examiner* — Brian W Cohen
(74) *Attorney, Agent, or Firm* — Dority & Manning, P.A.

(57) ABSTRACT

Disclosed are galvanic cells and methods for treating a molten salt by use of the galvanic cells. The galvanic cell can provide anti-corrosion treatment and improved corrosion resistance via electrochemical and chemical reactions involving a corrosive impurity in a molten salt. Reaction products of the chemical and electrochemical reactions include hydrogen gas that can carry hydrogen isotopes evolved in the molten salt. The system can also include removal of the hydrogen gas from the molten salt and separation and recovery of tritium contained therein.

21 Claims, 1 Drawing Sheet

(51) Int. Cl.
*C25B 9/09* (2021.01)
*G21G 1/02* (2006.01)

(56) References Cited

U.S. PATENT DOCUMENTS

| | | | | |
|---|---|---|---|---|
| 8,470,073 | B2 * | 6/2013 | Heung | B01D 59/26 423/248 |
| 9,368,244 | B2 | 6/2016 | Woolley | |
| 2014/0138257 | A1 | 5/2014 | Kramer et al. | |
| 2014/0226775 | A1 | 8/2014 | Devolpi | |
| 2016/0122881 | A1 * | 5/2016 | Garcia-Diaz | G21B 1/115 204/243.1 |
| 2020/0384411 | A1 * | 12/2020 | Hitchcock | C25B 9/23 |
| 2022/0186392 | A1 * | 6/2022 | Ding | C01D 3/14 |

OTHER PUBLICATIONS

Chan et al., "Insights on the corrosion thermodynamics of chromium in molten LiF—NaF—KF eutectic salts", npj Materials Degradation, 2022, 10 pages.

Dolan et al., "Tritium generation, release, and retention from in-core fluoride salt irradiations", Progress in Nuclear Energy, vol. 131, 2021, 10 pages.

Guo et al., "Corrosion in the molten fluoride and chloride salts and materials development for nuclear applications", Progress in Materials Science, vol. 97. 2018, pp. 448-487.

Hanson et al., "Effect of excess Mg to control corrosion in molten $MgCl_2$ and Kcl eutectic salt mixture", Corrosion Science, vol. 194, 2022, 12 pages.

Jiang et al., "Fluoride-salt-cooled high-temperature reactors: Review of historical milestones, research status, challenges, and outlook", Renewable and Sustainable Energy Reviews, vol. 161, 2022, 21 pages.

Keiser et al., "Interaction of beryllium with 316H stainless steel in molten $Li_2BeF_4$ (FLiBe)", Journal of Nuclear Materials, vol. 565, 2022, 16 pages.

Lam et al., "The impact of hydrogen valence on its bonding and transport in molten fluoride salts", Journal of Materials Chemistry A, vol. 9, 2021, 11 pages.

Sankar et al., "Effect of Li metal addition on corrosion of Hastelloy N and stainless steel 316H in molten LiF—NaF—KF", Journal of Nuclear Materials, vol. 555, 2021, 11 pages.

Surenkov et al., "Investigation of the Corrosion Resistance of Nickel-Molybdenum Alloys in the Eutectic LiF—NaF—KF", Atomic Energy, vol. 129, No. 3, Jan. 3, 2021, 6 pages.

Wang et al., "Method for identification of redox control parameters for corrosion mitigation in molten fluoride salts", Journal of Nuclear Materials, vol. 543, 2021, 6 pages.

Zeng et al., "A simulation study of tritium removal from molten salt at high temperature with tritium permeation through metallic material", Annals of Nuclear Energy, vol. 170, 2022, 7 pages.

Zhang et al., "Redox potential control in molten salt systems for corrosion mitigation", Corrosion Science, vol. 144, 2018, 10 pages.

* cited by examiner

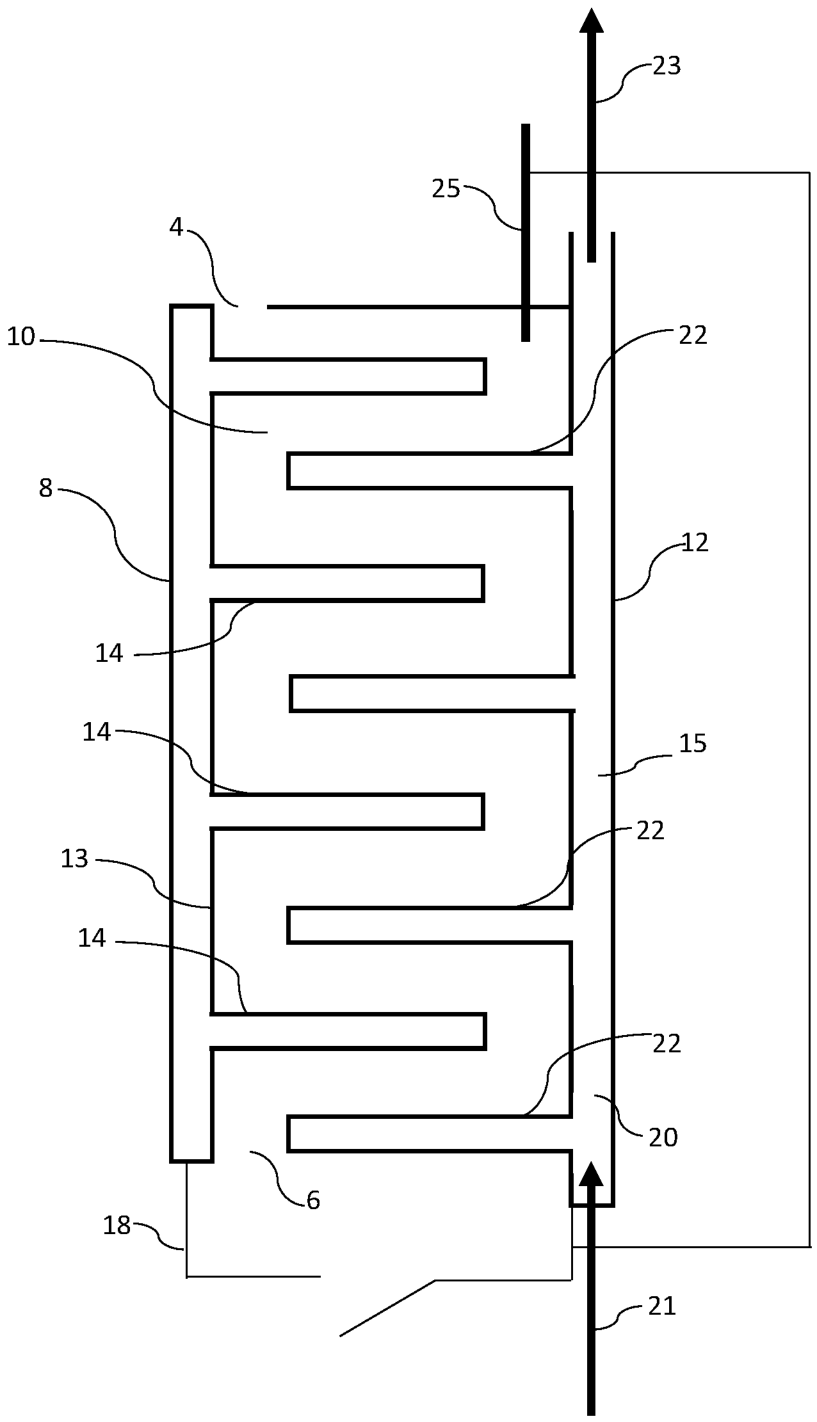
23
25
4
22
10
8
12
14
14
15
22
13
14
22
20
6
18
21

COMBINED CORROSION MITIGATION AND HYDROGEN ISOTOPE EXTRACTION FROM MOLTEN SALTS

FEDERAL RESEARCH STATEMENT

This invention was made with Government support under Contract No. 89303321CEM000080, awarded by the U.S. Department of Energy. The Government has certain rights in the invention.

BACKGROUND

Molten salt blankets, especially those formed of molten halides such as molten fluorides, have become important media for heat transfer and/or tritium breeding in nuclear applications, including both fission and fusion nuclear energy applications. The specific purpose of the molten salt blanket, as well as the enrichment material of the molten salt blanket, either lithium-6 or lithium-7, differ in different applications, but the need to remove hydrogen isotopes (especially tritium) produced through irradiation of the salt and the need to control the presence of corrosive components in the salt is necessary in all applications.

The formation of tritium occurs upon exposure of the molten lithium metal of the blanket to the neutron flux of a reactor utilizing a fission source, for instance, $U^{233}$, $U^{235}$, $Pu^{239}$, or a fusion source, for instance, deuterium-tritium upon which exposure lithium tritide (LT) will form in the blanket with the tritium bred by neutron reaction with lithium atoms. It is generally desirable that only small amounts of tritium be allowed to build up within the lithium blanket before the recovery rate matches the breeding rate. If the excess tritium is not removed from the blanket, the rate of tritium permeation through the blanket and heat exchanger structures can increase, which can pose a radioactivity problem. Large quantities of tritium in the blanket system can also increase the radioactivity hazards during routine maintenance and emergencies associated with mechanical and structural failures. As such, methods for separation of tritium from the lithium blanket are necessary. As tritium proves useful in applications such as lighting and weapons production, and is expected to be the primary fuel source for fusion reactors in deuterium/tritium (D/T) fueled power plants, methods for recovery of the separated tritium are desirable.

The introduction of impurities such as moisture, oxygen, and metals into the salt leads to corrosion in the system due to favorable reaction with alloying elements. Such impurities can be present in the blanket even when best efforts are made to maintain stable salt environments. Impurities in the salt provide pathways for corrosion by forming relatively unstable halides, such as hydrogen fluoride, that can then corrode vessel and system materials.

While separate and distinct unit operations have been developed to provide corrosion control via redox reaction of corrosive compounds and hydrogen isotope extraction, the two operations typically have kinetic rates that are increased with higher surface areas. Unfortunately, multiple high surface area unit operations will increase pressure drop in flowing systems, leading to increased pumping costs and associated consequences.

A single high surface area system that can combine redox corrosion control and tritium removal operations could provide system level benefits and increase the effectiveness of both redox control and hydrogen isotope extraction.

SUMMARY

According to one embodiment, disclosed is a molten salt treatment system. The system can include a galvanic cell that includes a first electrode and a second electrode. The first electrode includes an active metal. The active metal can be in any suitable form e.g., in the form of the pure metal, a metal alloy, a composite, a layered structure, a functionally graded material. The active metal exhibits chemical and electrochemical reactivity with one or more impurities of a molten salt, e.g., one or more corrosive impurities of a molten salt. The second electrode includes a catalyst and/or electrocatalyst that is active for hydrogen evolution, e.g., a noble metal or other material that can exhibit desired catalytic activity. The catalyst can in an any suitable form, e.g., in the form of a pure metal, a metal alloy, a composite, a layered structure, a functionally graded structure. The system also includes a molten salt pathway that separates the first electrode from the second electrode. The system can also include a hydrogen permeable surface. In embodiments, the hydrogen permeable surface can include the catalyst or electrocatalyst that is active for hydrogen generation, e.g., a palladium/silver alloy membrane that can function for both catalyzing hydrogen generation and hydrogen gas permeation.

According to one embodiment, disclosed is a method for treatment of a molten salt. The method can include flowing a molten salt along a pathway that separates a first electrode from a second electrode. The first electrode includes an active metal in any suitable format and the second electrode includes a catalyst or electrocatalyst for hydrogen generation. The method can also include closing a galvanic circuit. Upon closing the galvanic circuit one or more impurities contained in the molten salt can undergo electrochemical and chemical reactions. Electrochemical and chemical reaction products can include a hydrogen gas that can include tritium. The method can further include removing the hydrogen gas and thus tritium contained therein from the molten salt.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying FIGURE in which:

FIG. 1 schematically illustrates one embodiment of a system as disclosed herein.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is generally directed to a galvanic cell and methods for treating a molten salt by use of the galvanic cell. More specifically, the galvanic cell can be utilized to provide for both anti-corrosion treatment and hydrogen isotope removal from a molten salt of a molten salt blanket used in a nuclear energy application. Beneficially, as the cell is a galvanic cell, no input energy is required to encourage reactions at the electrodes. Combination of corrosion resistance through redox control with hydrogen isotope extraction into a single unit operation can be beneficial from a chemical engineering systems performance perspective and can provide both improved efficiency and decreased operating costs.

Disclosed systems incorporate an active metal at one of the electrodes of the galvanic cell that can be utilized in both electrochemical and chemical reactions involving the molten salts and one or more impurities, e.g., corrosive hydrogen-containing or other impurities in the molten salts. The reaction products of the electrochemical and chemical reactions can include hydrogen gas as well as non-corrosive (or less corrosive) salts. As the molten salt can include hydrogen isotopes formed through neutron interaction with the salt blanket, the hydrogen gas reaction products can likewise include hydrogen isotopes. Removal of the hydrogen gas reaction product can thus serve to remove hydrogen isotopes (and specifically tritium) from the molten salt stream.

FIG. 1 schematically illustrates one embodiment of a system as disclosed herein. As illustrated, a system can include an inlet 4 and an outlet 6 with a pathway 10 defined therebetween and through which a molten salt can be caused to flow. A system can include pumps, temperature control systems (e.g., various types of heaters), etc. as are known in the art to control the characteristics of the salt within the pathway and to provide for flow from a molten salt blanket of a nuclear reactor system to the inlet 4 of the system. As illustrated, the pathway 10 can define a serpentine route, which can increase the total surface area of the system and encourage more complete reactions as a molten salt passes through the system along the pathway 10. However, no particular pathway length or shape is required in disclosed systems. For instance, a spiral or other long route that can provide high surface area contact in a relatively compact system can be utilized as can any other large or small system.

Separated by the pathway 10, the system can include a first electrode 8 and a second electrode 12. The first electrode 8 can include an active metal at a surface of the electrode 8 that can be placed in contact with a molten salt within the pathway 10. Thus, the active metal of the electrode 8 can be held in ionic contact with a molten salt within the pathway 10 during use. The active metal of the electrode 8 can react electrochemically with the one or more impurities of the molten salt and form hydrogen gas as a reaction product. A molten salt blanket can include a plurality of impurities, e.g., hydrogen-containing impurities, nitrogen-containing impurities, etc. Impurities carried in the molten salt can often be corrosive, e.g., hydrogen-containing impurities such as hydrogen fluoride and the like.

By way of example, the active metal of the electrode 8 can include an alkaline metal (e.g., lithium, sodium, potassium, etc.), an alkaline earth metal (e.g., beryllium, magnesium, etc.), or any combination thereof. The active metal of the electrode 8 can be present in the electrode in any form in which it is available for reaction with one or more components of the molten salt. For instance, multiple active metals can be provided that can be mixed with one another and/or with other active materials of the electrode 8. The active metal can be a component of a metal alloy or can be combined with non-metallic elements. In one embodiment, and active metal can be intercalated with other materials of an electrode, e.g., carbon.

By way of example, an active metal can be present on/in the electrode 8 as the pure metal or as a component of an alloy, compound, or mixture. For instance, when considering utilization of a metal having a melting temperature greater than that of the molten salt to be treated by the system, e.g., beryllium or magnesium, the active metal can be provided on/in the electrode 8 in the pure metallic state. However, when considering utilization of a lower melting temperature active metal, e.g., lithium, the active metal can be present as a component of an alloy or chemical compound, e.g., $LiS_2$, or the like, so as to withstand the expected operating temperatures of the system.

Alloys of an active metal can include refractory metals such as vanadium, niobium, molybdenum, tantalum, tungsten, and rhenium. High temperature composites of an active metal can include the metal(s) in conjunction with a ceramic, e.g., a conductive ceramic. Composites can include one or more conductive materials that do not provide an active function in the desired reactions, e.g., carbon particles, graphene, or the like. Non-conductive materials can also be used in conjunction with an active metal in forming an electrode 8, provided that the non-conductive materials do not interfere with the electroactivity of the galvanic cell.

Active metals of the electrode 8 can be provided as a coating on an underlying material of the electrode 8. In some embodiments, an active metal can be present on a portion of a surface, e.g., the surfaces 14 that extend into a serpentine pathway 10, while other surfaces of the structure, e.g., supporting structure 13 do not contain the active metal, provided, of course that the active metal throughout the electrode 8 is included in the galvanic circuit 18. By way of example, a secondary supporting structure 13 of an electrode 8 can be formed of a corrosion resistant electrically conductive material including carbon compounds such as graphite or glassy carbon, ceramics such as silicon carbide or boron nitride, a corrosion resistant metal alloy, or composite material including carbon and ceramics, or a perfluorinated plastic material, such as a polyfluoroethylene, provided the material can withstand the operating temperatures of the galvanic cell and not interfere with the galvanic circuit 18.

In one embodiment, the active metal can include beryllium. Without wishing to be bound by any particular theory, in this embodiment the electrochemical half-cell reactions can include:

$$Be+2X^- \rightarrow BeX_2+2e^- \text{ at the electrode 8}$$

$$HX+2e^- \rightarrow H_2+2X^- \text{ at the electrode 12}$$

in which $X^-$ is an anion of the molten salt (e.g., $F^-$) and HX is a hydrogen-containing corrosive impurity of the molten salt (e.g., HF, TF, DF, or mixtures thereof, etc.).

The chemical reaction of the beryllium active metal at the electrode 8 can include:

$$2HX+Be \rightarrow BeX_2+H_2$$

In one embodiment, the active metal can include lithium. Without wishing to be bound by any particular theory, in this embodiment the electrochemical half-cell reactions can include:

$$Li+X^- \rightarrow LiX+e^- \text{ at the electrode 8}$$

$$HX+e^- \rightarrow \tfrac{1}{2}H_2+X^- \text{ at the electrode 12}$$

in which $X^-$ is an anion of the molten salt (e.g., $F^-$) and HX is a corrosive impurity of the molten salt (e.g., HF).

The chemical reaction of the lithium active metal at the electrode 8 can include:

$$2\ HX+2Li \rightarrow 2LiX+H_2$$

In those embodiments in which lithium or a lithium alloy is included in the active metal component, the lithium may be either lithium-6, lithium-7, or mixtures thereof, including natural lithium. Selection of the particular lithium isotope (or combination thereof) can depend upon the desired breeding ratio in the reactor system and can also be utilized to replace lithium of the molten salt blanket that can be consumed due to tritium breeding.

As the molten salt can carry hydrogen isotopes formed in the reactor system, the hydrogen formed in the reactions can include hydrogen isotopes, e.g., HD, HT, $D_2$, $T_2$, or any combination thereof in conjunction with the protium gaseous product $H_2$. The hydrogen produced by the reactions can either be dissolved in the molten salt carried through the system or can be present in the molten salt in the gas phase, generally depending on the concentration relative to the gas/liquid equilibrium state of the molten salt.

The active metal of the electrode 8 can be a sacrificial material in the chemical and electrochemical reactions. Accordingly, the entire electrode 8 or portions of the electrode 8 that include the sacrificial active metal can be replaced from time to time as needed. For example, in those embodiments in which the surfaces 14 that extend into the serpentine pathway 10 include the active metal, these portions of the electrode 8 can be replaceable, while other surfaces of the structure, e.g., support structure 13, can be a more permanent structure of the system and can be utilized to retain the replaceable portions that carry the active metal surfaces 14.

The second electrode 12 can include suitable active electrode material so as to complete the galvanic circuit during use. In one embodiment, the second electrode 12 can include a catalyst and/or electrocatalyst that can function as an electrode active material and encourage the active metal of the electrode 8 to react more readily react while enabling the half reaction of the electrochemical reaction process at the electrode 12. In one embodiment, the electrode active material of the electrode 12 can be a noble metal, though other materials as are known in the art are likewise encompassed herein, e.g., vanadium, niobium, tantalum, etc. The active electrode material of the second electrode can be present in any suitable form, e.g., a pure metal or as a component of an alloy, a compound, a mixture, a coating, etc.

Hydrogen produced in the system can be collected so as to avoid build-up of hydrogen in the molten salt. In accord with such an embodiment, the electrode 12 can include a surface that is permeable to hydrogen liberated in the electrochemical and/or chemical reactions of the cell. In one embodiment, the electrode 12 can include a hydrogen permeator 22 that includes the catalyst/electrocatalyst of the second electrode 12. For example, the electrode 12 can include a palladium membrane, which can function as a hydrogen permeator 22 as well as providing an electrically conductive noble metal catalyst useful in the hydrogen gas formation reactions. However, other hydrogen permeation materials as are known in the art other than or in conjunction with palladium may also be used. For instance, a hydrogen permeable material can include pure metals or alloys including a noble metal (e.g., gold, silver, platinum, etc.), niobium, tantalum, vanadium, or similar metals than can permeate hydrogen at high temperatures, and these metals can function as or be combined with a catalyst/electrocatalyst material for hydrogen generation. By way of example, in one embodiment, a hydrogen permeator 22 can include a palladium/silver alloy and can provide for hydrogen permeation as well as catalyst activity in hydrogen generation. A hydrogen permeator 22 can include multiple materials in an alloy, composite, layers, or the like, or in any combination thereof, in the electrode 12. In some embodiments, a hydrogen permeator 22 may have a layered structure or coatings to enhance transport, provide high hydrogen permeability, prevent corrosion, and/or give the permeator other enhanced properties.

In one embodiment, the electrode 12 can include a manifold 20 that can be under full or partial vacuum during use to facilitate permeation of hydrogen through the hydrogen permeator 22 as well as remove the separated hydrogen from the system. In another embodiment, a carrier gas, e.g., argon, helium, etc., can flow 21 through the manifold 20 to facilitate withdrawal of the hydrogen gas as it is produced. As hydrogen gas is formed and passes through a hydrogen permeator 22, it can be entrained within the carrier gas flow 21 and be conveyed out of the cell at 23 to be collected. A manifold 20 can be constructed to include an electrically conductive material to support the galvanic circuit 18. For instance, a manifold 20 can be formed of an alloy capable of extending operation of the system at the expected high temperatures of operation in the molten salt environment (e.g., a Hastelloy® or the like).

In one embodiment, the electrode 12 can include a series of hydrogen permeators 22 coupled with a manifold 20. The hydrogen permeators 22 can extend into the molten salt pathway 10 and be interdigitated with the active metal surfaces 14 of the electrode 8 to provide high surface area contact of the electrodes 8, 12 with a molten salt carried along the pathway.

In one embodiment, the electrode 12 can have a portion of a hydrogen permeator in the gas phase to permeate hydrogen that escapes to the gas phase or that is generated by chemical reactions and is subsequently transported to the gas phase.

In one embodiment, a hydrogen permeator separate from electrode 12 could be placed into the gas phase to permeate hydrogen that escapes to the gas phase or that is generated by chemical reactions and is subsequently transported to the gas phase.

The electrode 8 and the electrode 12 can be components of a galvanic circuit 18 that can be opened or closed by use of a control system so as to electrically connect the active metal of the electrode 8 with the noble metal of the electrode 12. The control system can utilize any suitable control mechanism that can be tied to one or more characteristics of the molten salt blanket of a reactor, one or more characteristics of the galvanic cell, or any other suitable control parameters for closing the circuit 18 and thereby instigating the electrochemistry of the system.

In some embodiments, the galvanic circuit 18 can include a reference electrode 25 that can monitor the electrochemical potential of the system. A reference electrode 25 can be a dynamic reference electrode. In one embodiment, a reference electrode 25 can be utilized to control and break galvanic contact (e.g., by tripping a circuit breaker of the system) and thereby can be utilized to control the reaction rate(s) within the cell. In another embodiment, ionic contact between the molten salt and the active metal can be stopped by removing the active metal from the molten salt, e.g., by pulling the electrode 8 from the molten salt, or by freezing the molten salt (e.g., by use of a freeze valve to control the temperature of the molten salt within the cell) and thereby prevent ionic current flow within the cell.

The load across the cell can be defined by the chemical reactions at the cathode and the anode. More specifically, the reduction potential of the half-reactions at the cathode 12 can be greater than the reduction potential for the half reactions at the anode 8, and the difference can define the load across the galvanic cell. By way of example, and without limitation, the open circuit voltage at the cathode can be about 0.5 volts or more greater than the open circuit voltage at the anode, or about 1 volt or more greater than the open circuit voltage at the anode in some embodiments. Of course, the kinetic losses and ohmic losses that will occur during operation of a system can affect the voltage across the cell, as can the specific cell design, configuration, electrode material, active metal, molten salt, etc., as is known.

The circuit 18 can also include an electronic load control element as is generally known in the art. An electronic load control element can be any suitable element that can vary the electrical load across the cell. For instance, the load control element can include a potentiostat, a potentiometer, a variable resistor, a static resistor, etc., that can dissipate the electrical load across the galvanic cell. The electrical load can be DC, AC, pulsed, or utilize other feedback control on the current or voltage.

In one embodiment, an electronic load control element can include a potentiostat. In general, a potentiostat can include an operational amplifier in a feedback control configuration in which the potential of the reference electrode 25 is controlled relative to the cell's working electrode. A potentiostat can also include control mechanisms as are known in the art to prevent damage to the cell components should the preset reference voltage become substantially different from the input voltage across the cell. During use, a potentiostat can measure and maintain a voltage across the cell as the electrochemical reactions take place. U.S. Pat. No. 4,227,988 to Galwey, et al, which is incorporated by reference, describes one embodiment of a potentiostat as may be incorporated in the galvanic cell.

The gaseous effluent 23 from the galvanic cell can include protium in addition to hydrogen isotopes, e.g., tritium. The gaseous flow 23 that exits a cell can be further processed for recovery of tritium from the hydrogen gas. For instance, the gaseous effluent flow 23 can optionally be examined by use of a radiation detector and can be immediately processed for tritium recovery or can be stored prior to processing.

In one embodiment, the gaseous effluent 23 can be further processed for recovery of tritium according to a thermal cycling adsorption process (TCAP) as is known in the art. One embodiment of a TCAP that may be utilized has been described in U.S. Pat. No. 8,470,073 to Heung, et al., which is incorporated herein by reference. Briefly, a TCAP process can incorporate a palladium column and an inverse column that can be to separate hydrogen isotopes into a tritium stream and a protium stream.

An inverse column can include an adsorbent that preferentially adsorbs the heavier hydrogen isotope. That is, the adsorbent of the column adsorbs tritium better than deuterium, and deuterium better than protium. During use, the column can be heated and cooled to cycle the temperature between a low temperature and a high temperature. The specific temperatures of the cycle can vary depending upon the specific adsorbent used. For instance, in one embodiment, the column can be cycled between about 90° C. and about 180° C. At the lower temperature the inverse column can adsorb hydrogen (and preferentially the heavier isotope (s) of hydrogen) and at the higher temperature the adsorbed hydrogen can be released. The amount of the heavy hydrogen isotope that is adsorbed by the column can vary depending upon flow rate and pressure of the gas.

Adsorbents for use in the inverse column can include, without limitation, a molecular sieve, activated carbon, alumina, silica, silica-alumina, clays, or mixtures of materials. Molecular sieves as may be utilized can include, for example, type 3A, type 4A, type 5A, type X, type Y, ZSM-5, Mordenite, type L, Omega, or other types having 3-10 Angstrom pore diameters that preferentially adsorb the heavier hydrogen isotopes. Transition metals such as vanadium and chromium and their alloys that can preferentially absorb hydrogen isotopes and have isotopic effect similar to the molecular sieves can also be used.

During use, the inverse column is alternatively heated and cooled. During the cool cycle, the tritium of the enriched gaseous flow is preferentially adsorbed by the inverse column, and an output line can contain primarily the lighter isotope (protium). During the hot cycle, the adsorbed material is release, and the output line can contain primarily the heavier isotope (tritium).

The adsorbent, e.g., palladium, can be supported on an inert support material, such as diatomaceous earth (also known as kieselguhr), which does not directly adsorb or separate hydrogen isotopes but can function as support for the adsorbent (e.g., palladium) to increase reaction kinetics and reduce pressure drop as the gas flows through the columns.

When utilizing a palladium adsorbent, the TCAP columns can be cycled from a low temperature of about 90° C. to a high temperature of about 180° C. At the lower temperature, hydrogen is adsorbed onto the adsorbent, with preference for protium adsorption, and at the higher temperature, the adsorbed materials are released from the adsorbent.

Tritium that is separated and recovered according to the disclosed methods and system can be suitable for any use as is known in the art. For instance, the recovered tritium can be utilized in self-powered lighting applications as a replacement for radium, as a fuel for controlled nuclear fusion reactions, or as a chemical tracer, for instance as a radiolabel or as a tracer in ocean circulation and ventilation.

While certain embodiments of the disclosed subject matter have been described using specific terms, such description is for illustrative purposes only, and it is to be understood that changes and variations may be made without departing from the spirit or scope of the subject matter.

What is claimed is:

1. A molten salt treatment system comprising:

a galvanic cell, the galvanic cell including a first electrode comprising an active metal, the active metal exhibiting electrochemical and chemical reactivity with an impurity of the molten salt, the active metal comprising an alkali metal or an alkaline earth metal, the galvanic cell including a second electrode comprising a catalyst or electrocatalyst for hydrogen generation, the galvanic cell further comprising a hydrogen permeator, wherein the first electrode and the second electrode are separated by a molten salt pathway, and wherein the galvanic cell operates without application of an external electrical energy input to drive electrochemical reactions at the first electrode and the second electrode.

2. The molten salt treatment system of claim 1, the active metal comprising beryllium or lithium.

3. The molten salt treatment system of claim 1, wherein the active metal is a component of an alloy, a composite, a layered structure, or a functionally graded material.

4. The molten salt treatment system of claim 1, the second electrode comprising the hydrogen permeator.

5. The molten salt treatment system of claim 3, the hydrogen permeator comprising the catalyst and/or electrocatalyst for hydrogen generation.

6. The molten salt treatment system of claim 1, the catalyst and/or electrocatalyst for hydrogen generation comprising a noble metal.

7. The molten salt treatment system of claim 1, the hydrogen permeator comprising palladium, vanadium, niobium, or tantalum.

8. The molten salt treatment system of claim 7, the hydrogen permeator comprising a palladium alloy.

9. The molten salt treatment system of claim 8, the palladium alloy comprising a palladium/silver alloy.

10. The molten salt treatment system of claim 1, the galvanic cell further comprising a reference electrode.

11. The molten salt treatment system of claim 10, the reference electrode being in electrical communication with a circuit breaker of the galvanic cell.

12. The molten salt treatment system of claim 1, further comprising a load control element.

13. The molten salt treatment system of claim 1, further comprising a hydrogen collection manifold.

14. The molten salt treatment system of claim 1, further comprising a thermal cycling adsorption process configured for hydrogen isotope separation.

15. The molten salt treatment system of claim 1, the first electrode further comprising a replaceable component, the replaceable component comprising the active metal.

16. A method for treating a molten salt, the method comprising:

flowing a molten salt along a pathway, the pathway comprising a galvanic cell including a first electrode and a second electrode wherein the pathway separates the first electrode from the second electrode, the first electrode comprising an active metal, the active metal comprising an alkali metal or an alkaline earth metal, the second electrode comprising a catalyst or electrocatalyst for hydrogen generation;

closing a galvanic circuit, and thereby encouraging chemical and/or electrochemical reactions in the molten salt, a reactant of the chemical and/or electrochemical reactions comprising a corrosive impurity of the molten salt, reaction products of the electrochemical and/or chemical reactions including hydrogen gas, wherein the galvanic cell operates without application of an external electrical energy input to drive chemical and/or electrochemical reactions at the first electrode and the second electrode; and separating the hydrogen gas from the molten salt.

17. The method of claim 16, further comprising separating tritium from the hydrogen gas.

18. The method of claim 16, further comprising at a later time opening the galvanic circuit.

19. The method of claim 18, wherein the galvanic circuit is opened upon a control signal from a reference electrode.

20. The method of claim 16, wherein the hydrogen gas is separated from the molten salt via a hydrogen permeator on the pathway.

21. The method of claim 16, wherein the pathway is fluidly connected to a molten salt blanket of a nuclear reactor, the method further comprising flowing the molten salt from the nuclear reactor to the pathway.

* * * * *